United States Patent [19]
Ali et al.

[11] Patent Number: 5,588,005
[45] Date of Patent: Dec. 24, 1996

[54] PROTOCOL AND MECHANISM FOR PRIMARY AND MUTTER MODE COMMUNICATION FOR ASSET TRACKING

[75] Inventors: Irfan Ali, Niskayuna; John E. Hershey, Ballston Lake; Stephen M. Hladik, Albany, all of N.Y.; Amer A. Hassan, Cary, N.C.; Sandeep Channakeshu, Cary, N.C.; Ravinder D. Koilpillai, Cary, N.C.; Kenneth B. Welles, II; Harold W. Tomlinson, both of Scotia, N.Y.

[73] Assignee: General Electric Company, Schenectady, N.Y.

[21] Appl. No.: 487,272

[22] Filed: Jun. 7, 1995

[51] Int. Cl.⁶ ................................................ H04Q 7/00
[52] U.S. Cl. .................... 370/346; 342/357; 340/825.54; 370/321
[58] Field of Search ................. 370/95.1, 95.2, 370/85.7, 85.8; 342/357, 450, 454, 457; 340/825.54, 991, 992, 993; 455/33.2

[56] References Cited

U.S. PATENT DOCUMENTS

| | | | |
|---|---|---|---|
| 4,651,157 | 3/1987 | Gray et al. | 342/457 |
| 4,884,208 | 11/1989 | Marinelli et al. | 342/351 |
| 5,144,312 | 9/1992 | McCann | 342/42 |
| 5,210,753 | 5/1993 | Natarajan | 370/95.1 |
| 5,212,806 | 5/1993 | Natarajan | 379/60 |
| 5,223,844 | 6/1993 | Mansell et al. | 342/357 |
| 5,225,842 | 7/1993 | Brown et al. | 342/357 |
| 5,289,176 | 2/1994 | Novakovich et al. | 370/95.2 |
| 5,379,224 | 1/1995 | Brown et al. | 364/449 |
| 5,445,347 | 8/1995 | Ng | 246/169 R |

Primary Examiner—Douglas W. Olms
Assistant Examiner—Min Jung
Attorney, Agent, or Firm—Marvin Snyder

[57] ABSTRACT

A mode of communication for asset tracking units involves communication between a central station and the individual tracking units, usually through a satellite link. This mode is the primary communication link for tracking the assets. A second mode is the local area network (LAN) or "mutter" mode, in which a subset of tracking units communicate with each other in a mobile LAN. This mode is used as the secondary communication mechanism to conserve power, since mutter mode communication requires much less energy for local communication between the tracking units as opposed to direct satellite communication with the central station. In addition, mutter mode leads to increased reliability of the asset tracking system by enabling tracking of units which have batteries too weak to support communication with the central station, but strong enough to support communication in mutter mode. The mutter mode is also useful in finding tracking units which are not communicating with the central station due primary communication equipment fault or other inhibiting condition.

6 Claims, 6 Drawing Sheets

PROTOCOL AND MECHANISM FOR PRIMARY AND MUTTER MODE COMMUNICATION FOR ASSET TRACKING

BACKGROUND OF THE INVENTION

1. Field of the Invention

This invention relates to asset tracking and, more particularly to the tracking of assets, including goods and vehicles, using the Global Positioning System (GPS). While goods are an example of assets that need to be tracked, the cargo containers, container trucks and railcars in which the goods are shipped are themselves assets which need to be tracked.

2. Background Description

Goods shipped from a manufacturing plant, warehouse or port of entry to a destination are normally tracked to assure their timely and safe delivery. Tracking has heretofore been accomplished in part by use of shipping documents and negotiable instruments, some of which travel with the goods and others of which are transmitted by post or courier to a receiving destination. This paper tracking provides a record which is completed only on the safe delivery and acceptance of the goods. However, there sometimes is a need to know the location of the goods while in transit. Knowledge of the location of goods can be used for inventory control, scheduling and monitoring.

Shippers have provided information on the location of goods by tracking their vehicles, knowing what goods are loaded on those vehicles. Goods are often loaded aboard shipping containers or container trucks, for example, which are in turn loaded aboard railcars. Various devices have been used to track such vehicles. In the case of railcars, passive radio frequency (RF) transponders mounted on the cars have been used to facilitate interrogation of each car as it passes a way station and supply the car's identification. This information is then transmitted by a radiated signal or land line to a central station which tracks the locations of cars. This technique, however, is deficient in that while a particular railcar remains on a siding for an extended period of time, it does not pass a way station. Moreover, way station installations are expensive, requiting a compromise that results in way stations being installed at varying distances, depending on the track layout. Thus the precision of location information varies from place to place on the railroad.

Recently, mobile tracking units have been used for tracking various types of vehicles, such as trains. Communication has been provided by means of cellular mobile telephone or RF radio link. Such mobile tracking units are generally installed aboard the locomotive which provides a ready source of power. However, in the case of shipping containers, container truck trailers and railcars, a similar source of power is not readily available. Mobile tracking units which might be attached to containers and vehicles must be power efficient in order to provide reliable and economical operation.

Most present-day asset tracking systems are land-based systems wherein a radio unit on the asset transmits information to wayside stations of a fixed network, such as the public land mobile radio network or a cellular network. These networks do not have ubiquitous coverage, and the asset tracking units are expensive. A satellite based truck tracking system developed by Qualcomm Inc., known as OMNITRACS, is in operation in the United States and Canada. This system requires a specialized directional antenna and considerable power for operation, while vehicle location, derived from two satellites, is obtained to an accuracy of about one-fourth kilometer. A rail vehicle positioning system described in U.S. Pat. No. 5,129,605 to Burns et al. is installed on the locomotive of a train and uses, to provide input signals for generating a location report, a GPS receiver, a wheel tachometer, transponders, and manual inputs from the locomotive engineer.

The mobile tracking unit used in the present invention includes a navigation set, such as a Global Positioning System (GPS) receiver or other suitable navigation set, responsive to navigation signals transmitted by a set of navigation stations which may be either space-based or earth-based. In each case, the navigation set is capable of providing data indicative of the vehicle location based on the navigation signals. In addition, the tracking unit may include a suitable electromagnetic emitter for transmitting to a remote location the vehicle's location data and other data acquired from sensing elements on board the vehicle.

The present invention obviates any need for a directional antenna and minimizes power requirements. Since both the navigation set and the emitter are devices which, when energized, require a large portion of the total electrical power consumed by the mobile tracking unit, it is desirable to control the respective rates at which such devices are activated so as to minimize power consumption by the mobile tracking unit.

SUMMARY OF THE INVENTION

It is therefore an object of the present invention to provide a method and protocol to locate and track multiple movable assets using a two-way satellite link.

Another object of the invention is to provide an asset tracking system which links proximate assets in a mobile local area network in a manner which conserves power and bandwidth.

In according with the invention, there are two modes of communication for the asset tracking units. The first of these modes is carried out between a central manager or station and the individual tracking units. This communication usually takes place through a satellite link. The second mode, carried out by the local area network, is referred to as the "mutter" mode, or mode in which a subset of tracking units communicate with each other in a mobile, dynamically-configured local area network (LAN).

The first of these modes is the primary communication link for tracking the assets. Mutter mode communication is used as a secondary communication mechanism to conserve power. The main requirements met by the mutter mode are the following:

1. Energy conservation. This is a key issue in asset tracking, since the individual tracking units have no external sources of energy. Mutter mode communication requires much less energy for local communication between the tracking units as opposed to direct satellite communication with the central station.
2. High reliability. Mutter mode leads to increased reliability of an asset tracking system by obtaining location information from asset tracking units which have batteries too weak to provide communication with the central station but which are capable of providing communication in mutter mode. Mutter mode also enables finding of tracking units which are not communicating with the central station due to a fault in their primary communication equipment or to some other inhibiting condition.

The invention specifies a protocol for mutter mode communication. The prime requirement of any protocol is that it be simple for implementation purposes and at the same time be robust under different failure modes. The protocol for the mutter mode as set forth herein makes use of the fact that a two-way communication channel exists between the tracking units and the central station. The central station includes a fairly powerful computer, allowing the processing power of that computer to be used in setting up and maintaining the mutter mode network. This enables the mutter mode protocol to be kept simple and reduces the complexity at individual tracking units whose numbers may be in the hundreds of thousands. Moreover, in conjunction with the protocol for the central station communication, the protocol for mutter mode communication is very similar. The frame structure developed for the central station communication protocol can be used for the mutter mode communication as well, further simplifying the implementation of mutter mode communication.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF A PREFERRED EMBODIMENT OF THE INVENTION

Figure 1:
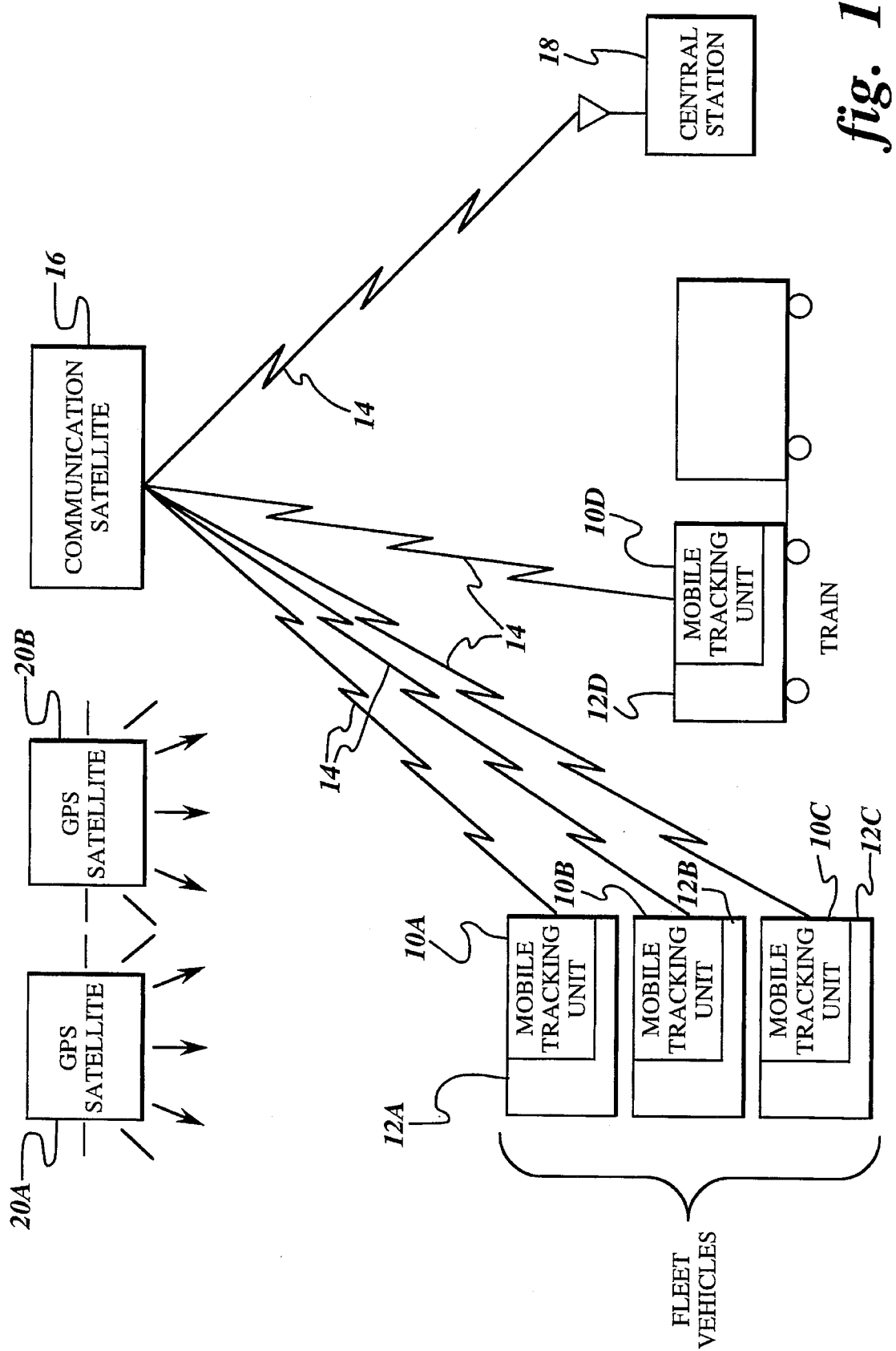
FIG. 1 is a block diagram of an exemplary asset tracking system which employs mobile tracking units in accordance with the present invention.

FIG. 1 illustrates mobile tracking units which employ navigation signals from a GPS satellite constellation, although, as suggested above, other navigation systems can be used in lieu of GPS. A set of mobile tracking units 10A–10D are installed in respective cargo-carrying conveyances, such as vehicles 12A–12D, which are to be tracked or monitored. A communication link 14, such as a satellite communication link through a communication satellite 16, can be provided between each mobile tracking unit (hereinafter collectively designated as 10) and a remote central station 18 manned by one or more operators and having suitable display devices and the like for displaying location and status information for each vehicle equipped with a respective mobile tracking unit. Communication link 14 can be conveniently used for transmitting vehicle conditions or events measured with suitable sensing elements. Communication link 14 may be one-way (from mobile tracking units to remote central station) or two-way. In a two-way communication link, messages and commands can be sent to the tracking units, thereby further enhancing reliability of the communication. A constellation of GPS satellites, such as GPS satellites 20A and 20B, provides highly accurate navigation signals which can be used to determine vehicle location and velocity when the signals are acquired by a suitable GPS receiver.

Briefly, the GPS was developed by the U.S. Department of Defense and gradually placed into service throughout the 1980s. The GPS satellites constantly transmit radio signals in L-Band frequency using spread spectrum techniques. The transmitted radio signals carry pseudorandom sequences which allow users to determine location on the surface of the earth (within approximately 100 ft), velocity (within about 0.1 MPH), and precise time information. GPS is a particularly attractive navigation system to employ, being that the respective orbits of the GPS satellites are chosen so as to provide word-wide coverage and being that such highly-accurate radio signals are provided free of charge to users by the U.S. government.

Figure 2:
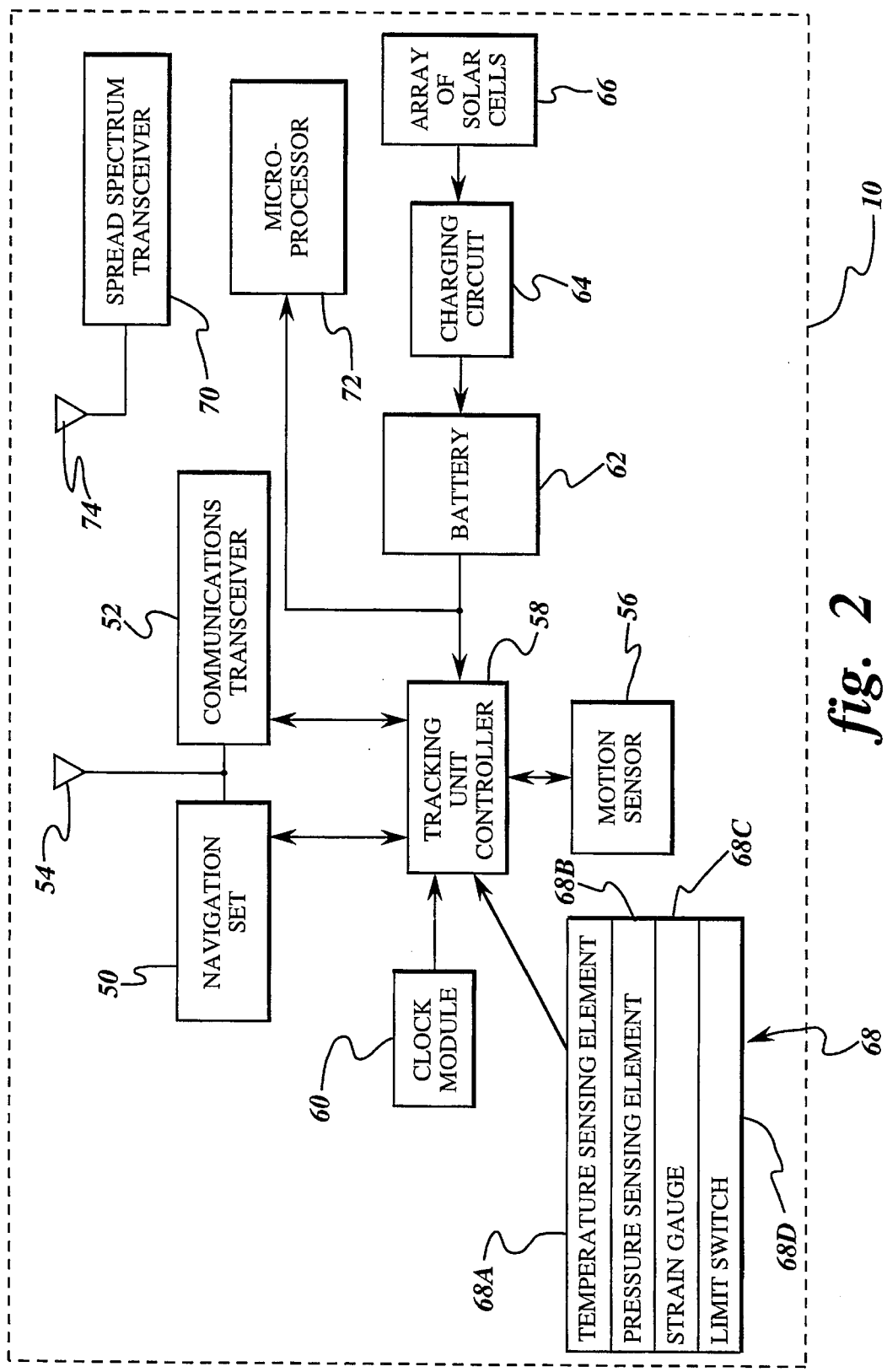
FIG. 2 is a block diagram showing in further detail a mobile tracking unit as used in the tracking system shown in FIG. 1.

FIG. 2 is a block diagram of a mobile tracking unit 10 which includes a navigation set 50 capable of generating data substantially corresponding to the vehicle location. Choice of navigation set depends on the particular navigation system used for supplying navigation signals to any given mobile tracking unit. Preferably, the navigation set is a GPS receiver such as a multichannel receiver; however, other receivers designed for acquiring signals from a corresponding navigation system may alternatively be employed. For example, depending on the vehicle location accuracy requirements, the navigation set may comprise a Loran-C receiver or other such less highly-accurate navigation receiver than a GPS receiver. Further, the navigation set may conveniently comprise a transceiver that inherently provides two-way communication with the central station and avoids the need for separately operating an additional component to implement such two-way communication. Briefly, such transceiver would allow for implementation of satellite range measurement techniques being that the vehicle location is determined at the central station simply through use of range measurements to the vehicle and the central station from two satellites whose position in space is known. The need for power by either such navigation set imposes a severe constraint for reliable and economical operation of the mobile tracking unit aboard vehicles which typically do not carry power supplies e.g., shipping containers, railcars used for carrying freight, truck trailers, etc. For example, typical GPS receivers currently available generally require as much as two watts of electrical power for operation. For the GPS receiver to provide a location fix, the GPS receiver must be energized for some minimum period of time in order to acquire sufficient signal information from a given set of GPS satellites so as to generate a navigation solution. A key advantage of the present invention is the ability to substantially reduce the energy consumed by the mobile tracking unit by selectively reducing the activation or usage rate for the navigation set and other components of the mobile tracking unit. In particular, if, while the vehicle is stationary, the activation rate for the navigation set is reduced, then the energy consumed by the mobile tracking unit can be substantially reduced, for example, by a factor of at least one hundred.

Mobile tracking unit 10 includes a suitable transceiver 52 functionally independent from navigation set 50. Transceiver 52 is optional depending on the particular design implementation for the tracking unit. Moreover, if the navigation set comprises a transceiver, then transceiver 52 would be redundant. Both communications transceiver 52 and navigation set 50 are actuated by a controller 58, which receives clock signals from a clock module 60. Transceiver 52 is capable of transmitting the vehicle location data by way of communication link 14 (FIG. 1) to the central station and receiving commands from the central station by way of the same link. If a GPS receiver is used, the transceiver and the GPS receiver can be conveniently integrated as a single unit for maximizing efficiency of installation and operation. An example of one such integrated unit is the Galaxy InmarsatC/GPS integrated unit which is available from Trimble Navigation, Sunnyvale, Calif., and is conveniently designed for data communication and position reporting between the central station and the mobile tracking unit. A single, low profile antenna 54 can be used for both GPS signal acquisition and satellite communication.

A low power, short distance radio link permits joining the nearby tracking units in a network to minimize power and maintain high reliability and functionality of such network. As shown in FIG. 2, in addition to a power source 62 (which comprises a battery pack that can be charged by an array of solar cells 66 through a charging circuit 64) a GPS receiver 50, a communications transceiver 52, and various system and vehicle sensors 68A–68D, each tracking unit includes a low power local transceiver 70 and a microprocessor 72. Microprocessor 72 is interfaced to all of the other elements of the tracking unit and has control over them. Transceiver 70 may be a commercially available spread spectrum transceiver such as those currently utilized in wireless local area networks. Spread spectrum transceiver 70 is equipped with its own low profile antenna 74.

Figure 3:
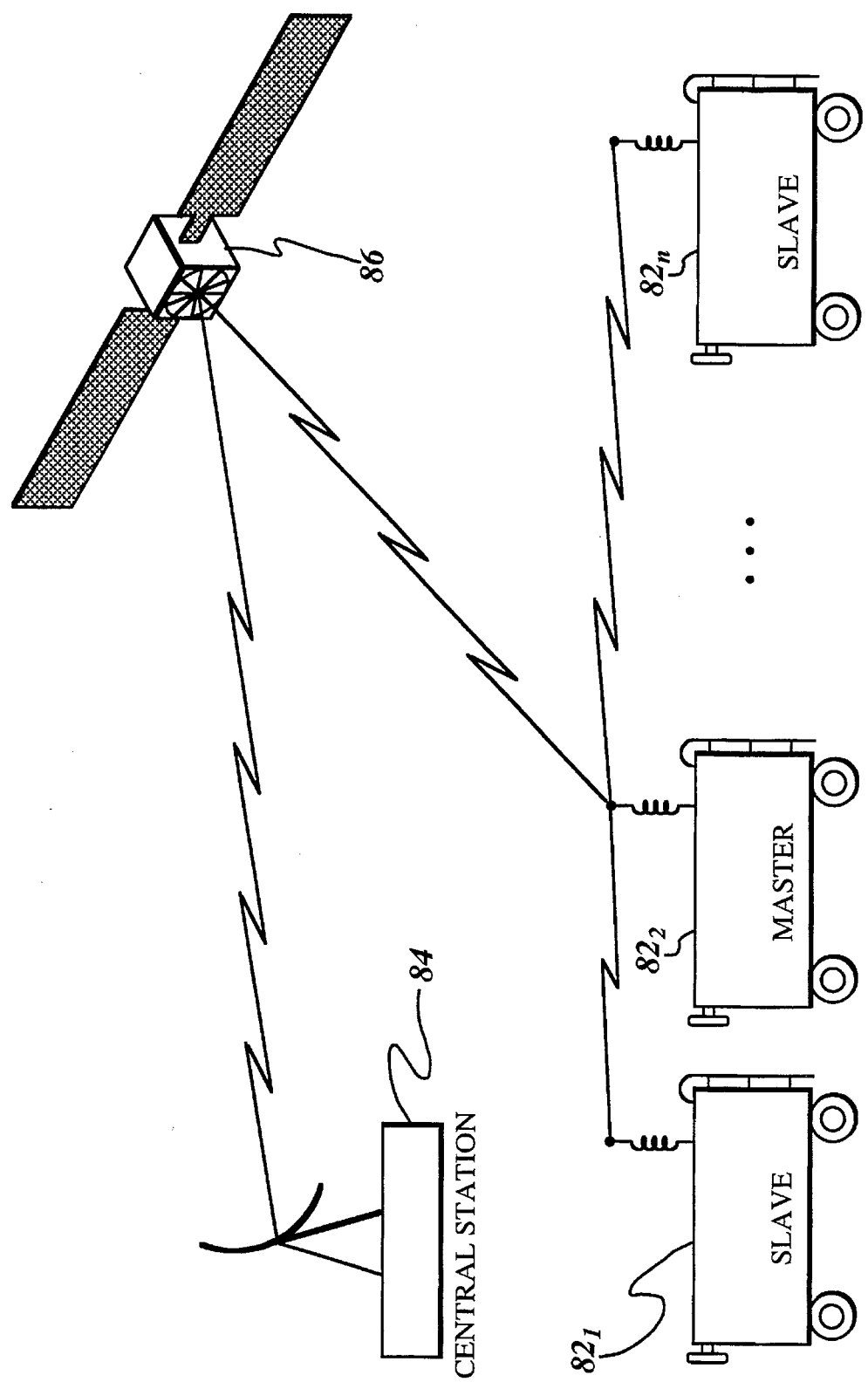
FIG. 3 is a block diagram illustrating organization of the mobile local area network implemented by the present invention.

Utilizing local transceiver 70, microprocessor 72 communicates with all other tracking units within communications range. When a train has multiple freight cars $82_1, 82_2, \ldots, 82_n$ equipped with tracking units of the type shown in FIG. 3, all of these units exchange information. The information exchanged allows the cars to recognize that they are all part of the same train. Because each microprocessor is interfaced to its own power sources, respectively, the status of available power for each tracking unit can also be exchanged. Once this information is available, the tracking unit with the most available power (i.e., most fully charged batteries) becomes the designated master, the other tracking units being slaves. The master tracking unit performs the GPS position and velocity reception and processing function, assembles these data along with the identification (ID's) of all other tracking units on the train, and transmits this information periodically in a single packet to a central station 84 via communication satellite 86.

To implement the protocol according to the invention, a two way communication link between the satellite and the asset tracking units is first established. This depends upon the access method, which is chosen to be a Time Division Multiple Access (TDMA) protocol. The TDMA protocol requires each tracking unit to transmit in an assigned timeslot during which no other unit transmits. A TDMA system requires tracking units to be time-synchronized to prevent communication collisions. This can be done using GPS absolute time as a reference, or it can be initiated by the central station using a broadcast control channel which is time-synchronized to the traffic channel used by the asset tracking units. The tracking units can synchronize to the broadcast control channel and hence derive synchronization to the traffic channel. The various tracking units are also assigned transmission frequencies and time slots by the central station.

When utilizing the TDMA profile, the tracking units transmit on the assigned frequency and respective time slots. The data sent comprises the tracking unit ID, its location (as derived from GPS or equivalent) and battery strength. The tracking unit can decode the GPS data and forward location information with its ID and battery strength. Alternatively, the tracking unit can avoid decoding the GPS data and forward the raw received data. In the latter case, the raw data together with the unit ID and battery strength are sent. This latter mode may be viewed as a store and forward mode. However, in order to maintain data integrity, a fairly high oversampling rate must be used which will increase the data rate at a cost of employing more power on the satellite link. Thus the trade-off is between the GPS processing power required at the tracking unit and the power required over the satellite traffic channel. The main advantage of the store and forward mode is that it requires less hardware in the asset tracking unit.

The central station receives the data from the different tracking units, and decodes and stores the information in a table. Each row of the table has at least four entries; namely, tracking unit ID, location, battery strength and signal quality. Signal quality here can be defined as received signal strength, bit error rate measured over a known sync word, or carrier-to-interference ratio. The table is sorted by location, and all asset tracking units within a predetermined proximity are grouped together. These asset tracking units form a "mutter" group. Next, a "best" tracking unit is chosen from each group, and the central station assigns that unit its new role. The best unit serves as the master tracking unit and collects data from each of the members of its group which have likewise been assigned their new role by the central station via the satellite link. The collected data are then transmitted by the master tracking unit via satellite link to the central station. This saves power as other tracking units in the group, especially ones with low battery power, do not have to transmit except at relatively long intervals.

The method by which the master tracking unit is chosen is as follows. From each of the groups in the table, the tracking units are sorted by battery strength and signal quality to determine the unit with not only the best battery strength but also the one with the best propagation path to the satellite. Use of the signal quality measure in selecting the best tracking unit helps overcome effects detrimental to signal quality, such as "shadowing", and provides inherent diversity. If shadowing is present, that is, if the tracking unit with the highest battery strength is under a canopy (e.g., foliage, ice or awning), then there is no point in choosing that tracking unit to forward the group's data as that unit will need to expend substantial power to overcome the attenuation of the canopy.

Because very little data must be transferred between a slave tracking unit and a master tracking unit, this communication link can be designed to be very low in power. Simple message repetition with differentially encoded modulation and differential detection can be used for the mutter mode.

The protocol for mutter mode according to the present invention is a simple polling scheme in which the master tracking unit sequentially polls the other tracking units in the group. The tracking units which do not communicate with the central station directly, but in fact report to the master tracking unit, are referred to as slave units. Since direct communication with the central station is the primary mode of communication, tracking units operate in the mutter mode only at the command of the central station, through a process known as the mutter mode handover process. The main steps of the handover protocol are as follows.

Each tracking unit must be enlisted with the central station. Through the central station communication protocol, the tracking unit registers itself. Hence, the central station has information as to the position of the tracking unit and the status of its various components, for instance, the health of its battery and its various sensor readings. As long as the tracking unit is in direct communication with the central station, it is continually being polled by the central station.

Based on the information at the central station, the central station might form a mutter mode network in a vicinity where there are multiple tracking units. Whether or not to form such network can be a function of battery levels at the tracking units.

In forming a mutter network in a vicinity, the central station selects one or more master tracking units which will be reporting for other tracking units in the vicinity. These master tracking units are selected because they have a strong battery and a good communication link with the central station. They also perform polling of the slave tracking units.

When the central station initiates a change in the status of a tracking unit to a slave unit through the central station communication channel, it commands the slave unit to receive a polling command from a particular master unit in the mutter mode channel. At the same time, it commands the master unit to poll the slave unit. If the polling is successful, the slave unit is assigned to that particular master unit. The success or failure of the mutter mode poll is relayed to the central station by the individual tracking units. If the polling is successful, the slave station is assigned to the master station in the mutter mode network and the central station no longer directly polls the slave unit. The slave unit now communicates with the master unit in the mutter mode. If the polling in the mutter mode is not successful, either the master or the slave or both of them provide this information to the central station. The central station then assigns another master station to the slave unit and the same procedure repeats. This happens until there is a successful poll in the mutter mode or until all the masters in a predetermined vicinity are exhausted.

Each master tracking unit, being responsible for a list of slave tracking units, sequentially polls the slave units of the list at fixed intervals. The frame structure for master-slave and slave-master communication is illustrated below:

| Bits | 8 | 24 | 24 | 8 | variable | 16 |
|---|---|---|---|---|---|---|
| | SYNCH | DEST ADDR | SOURCE ADDR | C | DATA | FEC | where SYNCH is the synchronization preamble to establish carrier synchronization and symbol boundaries, DEST ADDR is the destination address of the tracking unit to which the packet is destined and may be a broadcast address in case the packet is addressed to all tracking units, SOURCE ADDR is the address of the source unit, C is a control field designating the message type, DATA is the main information in the message, and FEC is a forward error correction for errors formed over DEST ADDR field through DATA field. Bit stuffing or bit escaping is used to avoid inadvertent flag creation. The number (or designation) above each segment of the packet indicates the number of bits that make up the respective segment.

Figure 4:
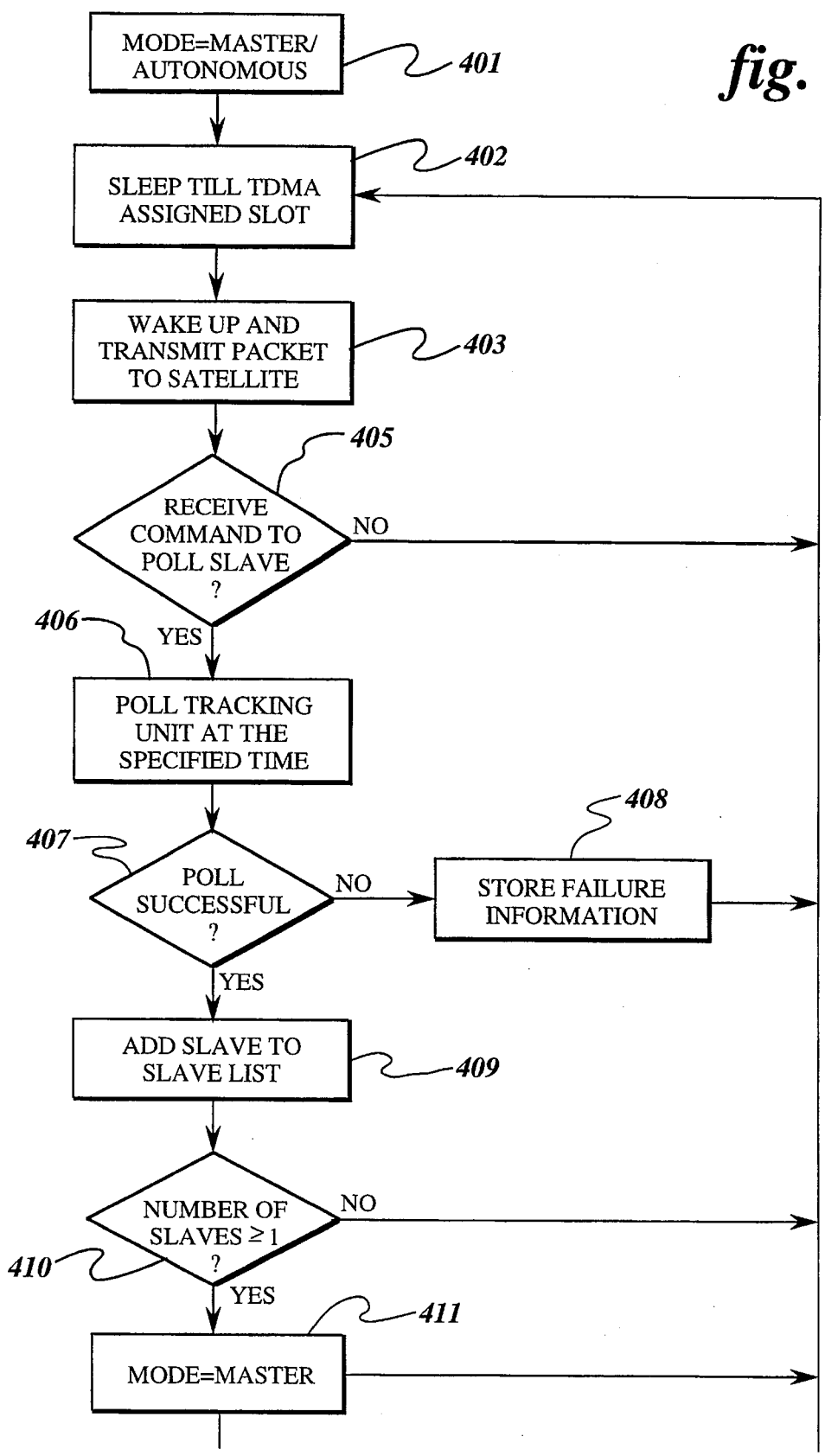
FIG. 4 is a flow diagram of the process employed at a master tracking unit, of adding a slave tracking unit to a mutter mode LAN.

FIG. 4 is a flow diagram of the process at an autonomous or master tracking unit for adding a slave tracking unit to either an existing LAN or to form a LAN. The mode is initially set at step 401 to either master or autonomous, depending on whether a LAN exists or is to be formed. The autonomous or master unit remains in low power or "sleep" operation until occurrence of its TDMA assigned slot at step 402. At this time, the unit "wakes up" and transmits a packet to the satellite at step 403. A test is then made at step 404 to determine if a command has been received by the autonomous or master unit to poll a slave unit. If not, the process loops back to step 402 to await the next TDMA assigned slot. However, if a command to poll a slave unit has been received, the autonomous or master unit polls the slave tracking unit at a specified time at step 405. A test is then made at decision step 406 to determine if the poll was successful. If not, the failure is stored at step 407 before the process loops back to step 402. If the poll is successful, the slave is added to the master's slave list at step 408. A test is next made at decision step 409 to determine if the number of slave units is greater than or equal to one. If not, the process loops back to step 402; otherwise, the mode of the unit is set to master before the process loops back to step 402. Thus, if the original mode was autonomous, the addition of a slave unit to the slave list results in the mode of the unit being changed to master.

Figure 5:
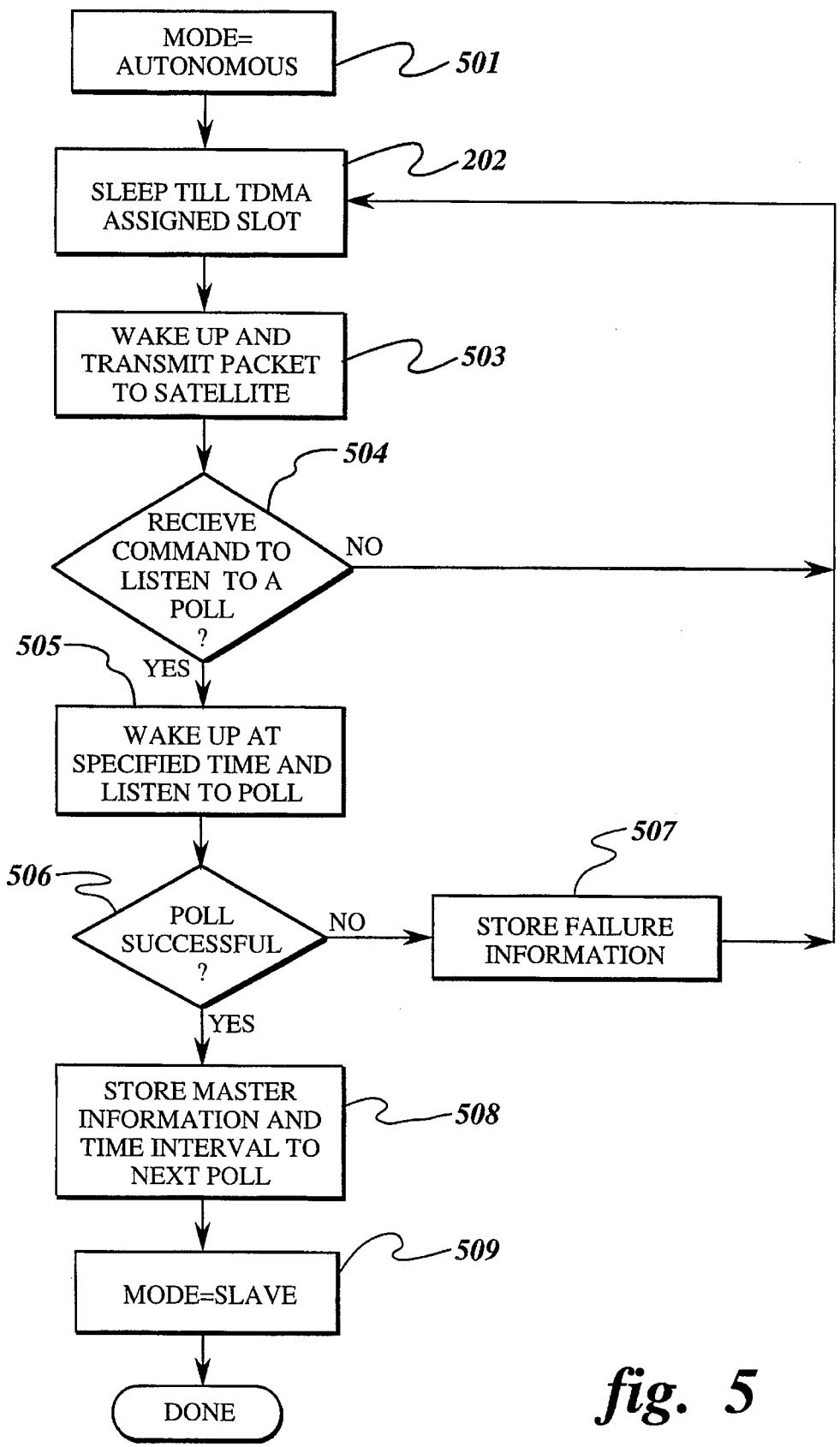
FIG. 5 is a flow diagram of the process, employed at an autonomous tracking unit, by which that unit transitions to a slave mode.

FIG. 5 is a flow diagram illustrating the process at an autonomous tracking unit by which it transitions to a slave mode. Initially, the mode of the unit is autonomous at step 501. The unit remains in low power or "sleep" operation until occurrence of its TDMA assigned slot at step 502. At this time, the unit "wakes up" and transmits a packet to the satellite at step 503. A test is then made at decision block 504 to determine if a command has been received to listen for a poll. If not, the process loops back to step 502 to await the next TDMA assigned slot. However, if a command to listen for a poll has been received, the unit wakes up at the specified time and awaits a poll at step 505. A test is then made at decision step 506 to determine if a poll was received at the specified time. If not, the failure is stored at step 507 before the process loops back to step 502. If the poll is received, the master information and time interval to the next poll is stored at step 508, and the mode of the unit is set to slave at step 509 before the process loops back to step 502.

In the case of master-slave communication, the destination address is the address of the slave tracking unit, whereas in the case of slave-master communication, it is the address of the master tracking unit. A predefined central station address can be used by the master unit to multi-cast messages to multiple slave units as in the case of time and data information update. A control field designates the message type. The various message types can include polling for slave status information, specifying to a slave unit a new master unit, acknowledgment of apparent error-free message reception, request for retransmission, and the like. For master-to-slave communication, the data can contain the time at which the slave unit should transmit its information and the time of the next polling epoch for that slave unit. In the case of slave-to-master communication, the data field will contain status information from the slave unit.

Figure 6:
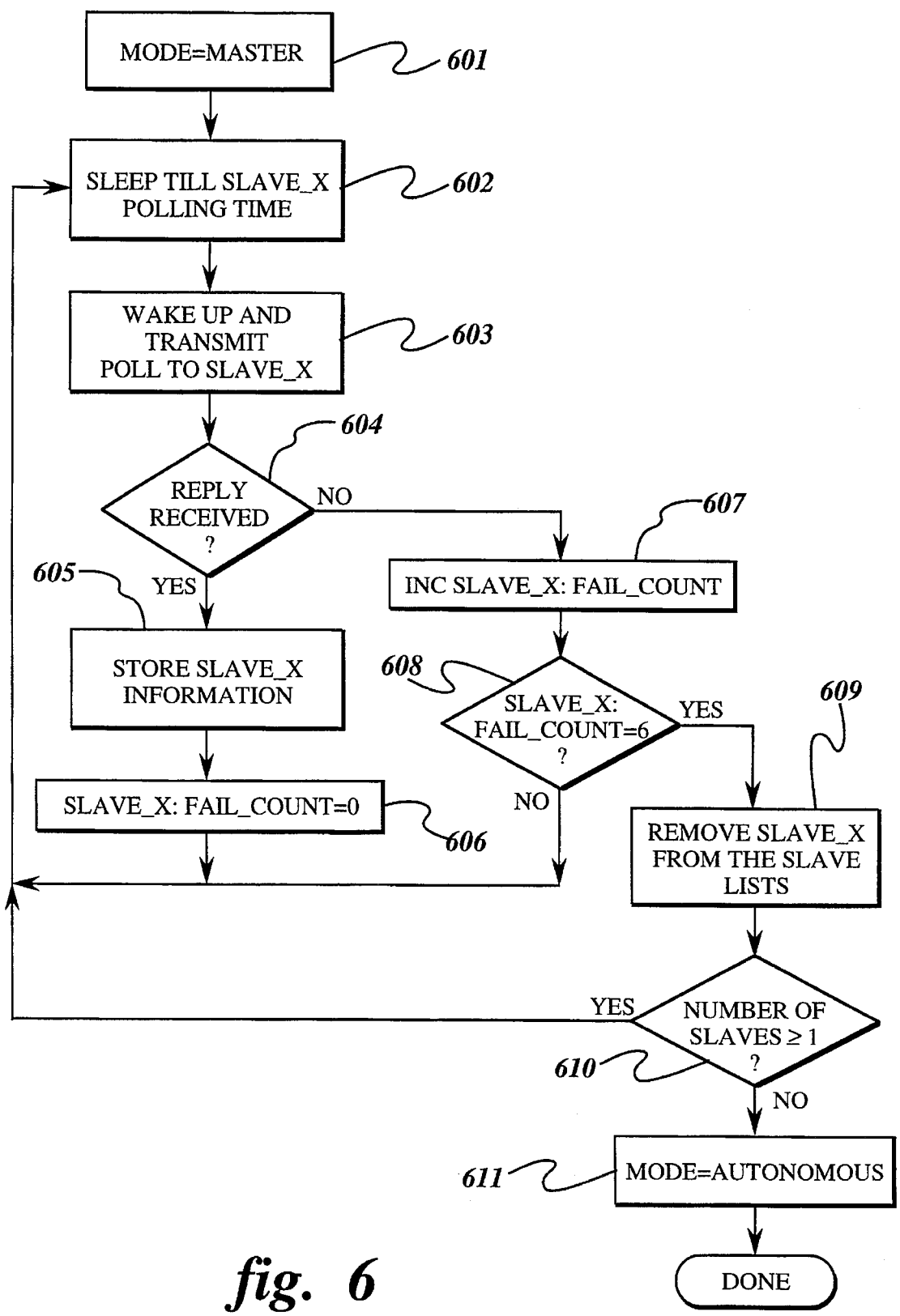
FIG. 6 is a flow diagram of the process, employed at a master unit, for polling a slave tracking unit.

FIG. 6 is a flow diagram illustrating the process at a master tracking unit for polling one slave tracking unit. For each slave unit, the master unit goes through a similar logic. The mode is set to master at step 601. The master unit "sleeps" until the slave unit polling time at step 602. At that time, the master unit "wakes up" and transmits a poll to the slave unit at step 603. A test is then made at decision step 604 to determine whether a reply was received from the slave unit. If so, the slave unit information received is saved at step 605, the failure count for that slave unit is set to zero at step 606, and the process loops back to step 602. If, however, a reply is not received, the failure count for that slave unit is incremented at step 607. A test is made at decision step 608 to determine if the failure count for that slave unit is equal to six. If not, the process loops back to step 602; otherwise, the slave unit is removed from the master's slave list at step 609. Next, a test is made at decision step 610 to determine if the number of slave units on the master's slave list is equal to or greater than one. If so, the process loops back to step 602. If not, the mode for the unit is set to autonomous at step 611, and the process exits.

The slave tracking unit resets a timer every time a successful poll occurs. It then goes into its sleep mode to conserve its battery and "wakes up" to receive the next poll from the master tracking unit. The time interval to the next poll is explicitly provided by the master tracking unit to the slave tracking unit in every poll instance. If, however, the slave tracking unit does not receive the poll and the timer reaches the end of its present time interval, the slave tracking unit can turn on its central station communication receiver. Since the central station is in communication with the master tracking unit and does not receive the message from the master tracking unit about a particular slave tracking unit, it will attempt to poll the slave tracking unit directly. Once the slave tracking unit receives the message from the central station, it resorts to the central station communication until the central station joins another mutter mode network.

The mutter mode protocol is totally free of collisions between messages. This is due to the polling mechanism used for exchange of information. In the event multiple master tracking units exist in the same vicinity, the central station can assign different frequency bands for different mutter mode networks so as to avoid inter-mutter mode network conflicts. This ensures that no inter-mutter mode network message collisions occur as long as newer mutter mode networks do not enter the same vicinity as, for instance, when a new train moves in. If this occurs, the responsibility of reconfiguring the network lies with the central station.

If the signal quality and/or battery strength of the master tracking unit drops below an acceptable threshold, the central station resorts the table and reassigns a new master tracking unit. The master tracking unit will receive data from several tracking units within a predetermined time-window or time slot. If a tracking unit is unable to transmit to the master tracking unit because it has no line of sight to the master, then that time slot will be filled with "noise". When no recognizable data and tracking unit ID are decoded at the central station, the following action is initiated by the central station. First, the central station searches for the missing IDs from the list in the table for that group. It then broadcasts a message to those units whose IDs are missing to transmit to another master tracking unit, which may be visible, or to transmit directly to the satellite. If still no message is received, the noncommunicating tracking unit is presumed to be either damaged or completely hidden. The last location of the noncommunicating unit is recorded and forwarded with a history of locations and time stamps to alert the concerned organization.

If the master tracking unit does not receive a response from the slave tracking unit, it can query the slave tracking unit up to a maximum number of times at predetermined time intervals, as might be necessary with a fading channel. Should these polls fail, the master tracking unit will remove the slave tracking unit from its polling table and communicate the loss of the slave tracking unit to the central station. The central station will then try to communicate directly with the slave tracking unit through the central station communication channel.

A tracking unit that is lost and has low power is called an "orphan". The system can be configured to attempt to locate orphans or it can treat it as a lost unit and use the above reporting procedure. If the system attempts to locate the orphan, it will use the last location of the orphan to alert nearby mutter mode tracking units to transmit a "lost" message. The tracking units are designed to enter a "sleep" mode if their battery strength is very low. In the "sleep" mode, they will periodically be activated to receive a "lost" message and reply briefly if such message is received. If the orphan receives the "lost" message, it will respond and can thus be located by another tracking unit which will relay this information to the central station via the usual protocol.

When a cargo conveyance goes into a repair facility for servicing, which may require as much as several weeks out of service, manual intervention may be required or the tracking unit affixed to the conveyance can be treated as an orphan. Manual intervention implies informing the central station via a computer connection. In either case, the central station will use a deactivation flag for that tracking unit in its sort table and will reactivate the unit after the servicing or when the central station receives location and ID information from the tracking unit.

Use of centralized control at the central station with respect to multiple access methods allows the channel resources (i.e., time slots, frequencies, codes) to be monitored and hence allows optimum assignments. This maximizes system capacity via reuse of channel resources at geographically separate locations. For CDMA on the reverse link (i.e., tracking units transmitting to satellite), power control is required to compensate for loss due to being off bore-sight in the antenna gain pattern. With location information of each asset, the central station can allow each tracking unit to adjust its power to compensate for the attenuation due to the antenna beam roll-off. It is most advantageous in terms of capacity and equipment complexity to use TDMA on the forward link (i.e., satellite to tracking unit). An advantage of using TDMA on the reverse link is that it provides a variable bandwidth capability in the mutter mode. In this mode, as more units join a mutter group, the master tracking unit has to send more data. An additional data requirement can be dynamically met by assigning more than one time slot to the master tracking unit. This use of multiple TDMA time slots can also be exploited to obtain a diversity advantage. This is done by repeating transmissions in multiple time slots and using a majority logic vote at the receiver. This provides large power savings at the transmitter.

Among the advantages of the invention over prior art systems, therefore, are:

1. The satellite system provides ubiquitous coverage and better coverage than a land mobile radio system.
2. Mutter mode allows one transmitter out of the group to transmit at any given time and thereby conserves power, effectively averaging power over the whole group over a period of time.
3. By allowing the central station to have centralized control, all the network and signal processing complexity is transferred from the tracking units to the central station where there are no power limitations.
4. The central station has a table of all users in the system, together with their locations, permitting it to dynamically assign channels to tracking units as required, thereby maximizing capacity and reducing message collisions to improve throughput and delay characteristics.

5. Since all network management is in the central station, the system can be easily evolved to support larger number of users without changing the protocol to the individual tracking units or reprogramming them.

6. The signal quality sorting method provides a diversity advantage in shadowed channels which are often encountered in satellite links, which translates to a power saving on the tracking units.

7. The processing power of the central station allows all GPS processing to be done at the central station instead of the tracking unit, resulting in a hardware reduction in the tracking unit.

8. Tracking units that are damaged or lost can be traced easily from the record kept at the central station.

9. The use of multiple TDMA accommodates variable rates, which is necessary for a mutter group growing in size.

10. Multiple TDMA slots can be used to repeat data to obtain a power gain via majority logic decoding at the receiver.

11. The centralized control supports system authentication, verification, encryption and wide area roaming.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

Having thus described our invention, what we claim as new and desire to secure by Letters Patent is as follows:

1. A method of tracking assets comprising the steps of:
   affixing a battery powered tracking unit to each asset to be tracked;
   communicating with each tracking unit from a central station to receive from each tracking unit identification (ID), location, battery strength, and signal quality;
   storing and maintaining a table at the central station, said table including the ID, location, battery strength, and signal quality of each tracking unit;
   sorting at the central station tracking units in the table by location to identify tracking units within groups proximate to one another;
   sorting at the central station tracking units within each group to identify a tracking unit within said each group which has acceptable battery strength and signal quality; and
   establishing a mobile local area network of tracked assets among a plurality of tracking units within said each group, each of said tracking units constituting a node of the mobile local area network, with a tracking unit within the group having acceptable battery strength and signal quality acting as a master unit and other tracking units in the group acting as slave units.

2. The method of tracking assets recited in claim 1 wherein the step of communicating with each tracking unit comprises the steps of:
   assigning a time slot for transmission by a tracking unit to the central station;
   transmitting a packet of information from a tracking unit to the central station, said packet of information including tracking unit ID, location, battery strength, and signal quality; and
   transmitting commands to the tracking unit from the central station.

3. The method of tracking assets recited in claim 2 wherein said each tracking unit can assume an autonomous, master or slave mode, said each tracking unit initially being set in the autonomous mode, and wherein the step of establishing a mobile local area network comprises the steps of:
   transmitting a command to a first tracking unit to poll a second tracking unit at a specified time;
   polling the second tracking unit from the first tracking unit at the specified time;
   communicating to the first tracking unit a response from the second tracking unit;
   adding the second tracking unit to a slave list stored by the first tracking unit; and
   setting the first tracking unit to a master mode.

4. The method of tracking assets recited in claim 2 wherein said each tracking unit can assume an autonomous, master or slave mode, said each tracking unit initially being set in the autonomous mode, and wherein the step of establishing a mobile local area network comprises the steps of:
   transmitting a command to the first tracking unit to await a poll;
   storing at the first tracking unit information received in the poll identifying the master tracking unit of the local area network; and
   setting the first tracking unit to a slave mode.

5. The method of tracking assets recited in claim 3 wherein said each tracking unit can assume an autonomous, master or slave mode, said each tracking unit initially being set in the autonomous mode, and wherein the step of establishing a mobile local area network comprises the steps of:
   periodically transmitting polls by the master tracking unit at specified times to tracking units on the slave list stored by the master tracking unit;
   determining whether a response has been received from each tracking unit polled by the master tracking unit;
   counting by the master tracking unit a number of consecutive failures to receive a response from polls for each tracking unit on the slave list; and
   removing from the master tracking unit's slave list any tracking unit having a number of failures exceeding a predetermined value.

6. The method of tracking assets recited in claim 5 further comprising the steps of:
   checking the slave list of the master tracking unit to determine if the slave list is empty; and
   setting the mode of the master tracking unit to autonomous when the slave list is determined to be empty.

* * * * *